United States Patent [19]

Lust et al.

[11] Patent Number: 5,540,410
[45] Date of Patent: Jul. 30, 1996

[54] MOLD HALVES AND MOLDING ASSEMBLY FOR MAKING CONTACT LENSES

[76] Inventors: Victor Lust, 2808 Scott Mill Estates Dr., Jacksonville, Fla. 32257; Michael F. Widman, 5319 Gathering Oaks Ct. East; Kornelis Renkema, 12412 Autumnbrook Trail West, both of Jacksonville, Fla. 32258; Ture Kindt-Larsen, Søllerødvej 40, DK-2840 Holte, Denmark; Wybren Van Der Meulen, Breembos q, Neunen, Netherlands; Daniel T. F. Wang, 13753 Night Hawk Ct., Jacksonville, Fla. 32224

[21] Appl. No.: 257,785

[22] Filed: Jun. 10, 1994

[51] Int. Cl.⁶ .......................... B29C 33/38; B29C 45/18
[52] U.S. Cl. .......................... 249/134; 249/117; 264/2.5; 264/225; 264/328.12; 264/328.16; 425/552; 425/808
[58] Field of Search .................. 425/808, 548, 425/552, 556, 588; 249/117, 134; 264/2.5, 225, 328.12, 328.16

[56] References Cited

U.S. PATENT DOCUMENTS

| | | | |
|---|---|---|---|
| 3,894,710 | 7/1975 | Sarofeen | 249/117 |
| 4,091,057 | 5/1978 | Weber | 425/808 |
| 4,390,482 | 6/1983 | Feurer | 425/808 |
| 4,540,534 | 9/1985 | Grendol | 425/808 |
| 4,565,348 | 1/1986 | Larsen | 249/134 |

FOREIGN PATENT DOCUMENTS

| | | | |
|---|---|---|---|
| 61-35221 | 2/1986 | Japan | 425/808 |
| 61-94734 | 5/1986 | Japan | 425/808 |

*Primary Examiner*—Robert Davis

[57] ABSTRACT

Disclosed are mold halves useful in molding a contact lens by polymerization of a polymerizable composition disposed between the mold halves. The mold halves are of rigid thermoplastic, preferably polystyrene, transparent to ultraviolet light.

30 Claims, 3 Drawing Sheets

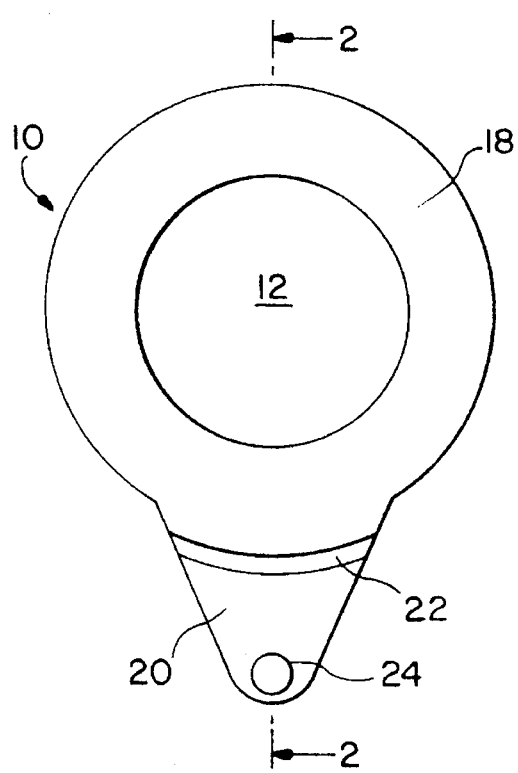
FIG.1
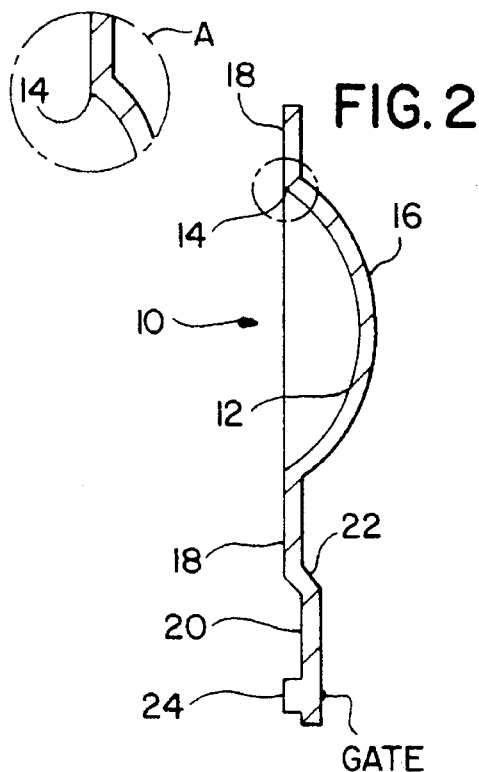
FIG.2A
FIG.2
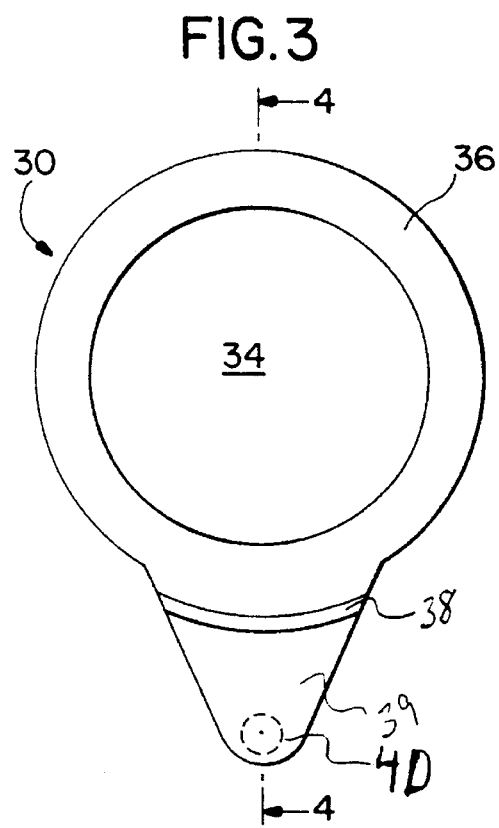
FIG.3
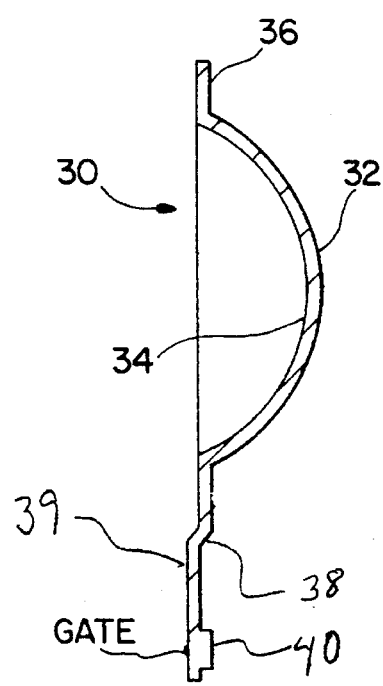
FIG.4

MOLD HALVES AND MOLDING ASSEMBLY FOR MAKING CONTACT LENSES

BACKGROUND OF THE INVENTION

1. Field of the Invention

The present invention relates generally to an arrangement and method for molding contact lenses, using a front mold half and a second complementary base mold half which together define a mold and mold cavity within which one can polymerize a polymerizable composition to form a contact lens such as a hydrogel soft contact lens, or an article which needs only to be swollen in appropriate aqueous medium (e.g., saline solution) to be a wearable contact lens. As used herein, the terms "contact lens" and "lens" are intended to embrace contact lenses which are fully swelled and ready to wear in the eye, and to embrace such lenses in their unswelled or partially swelled states, except where particular context requires otherwise.

More particularly, the subject invention pertains to uniformly acceptable, optical quality mold halves and to a mold assembly comprising a front mold half, a base mold half, and a polymerizable composition contained in the cavity between said mold halves.

2. Discussion of the Prior Art

U.S. Pat. No. 4,565,348 to Larsen discloses a typical prior art approach to manufacturing mold halves having an objective similar to that of the present invention. Pursuant to this prior art approach, the mold halves are molded as a set of eight mold halves carried on a frame in a 2×4 array. FIG. 3 of the Larsen patent illustrates a molded frame carrying a 2×4 array of concave front or female mold halves, while FIG. 5 therein shows a molded frame carrying a 2×4 array of convex base or male mold halves. The cluster assembly of the frame and molds is manufactured by injection molding the assembly as one piece with the molds being secured within an outer rectangular frame by small struts extending between the frame and the molds. The height of the frame is such that the surfaces of the molds are protected from scratching and mechanical damage during handling, and the frame in general has a shape facilitating stacking and handling. This prior art approach of molding such polystyrene mold halves in a cluster assembly typically takes approximately twenty-four (24) seconds, which is now considered to be too long for the efficient production of such polystyrene mold halves. In contrast thereto, pursuant to the present invention, the molding of such thermoplastic mold halves takes approximately three to six seconds depending on the wall thickness.

The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application.

SUMMARY OF THE INVENTION

In one aspect, the present invention comprises mold halves useful in the production of a contact lens (i.e., a lens having ready-to-wear dimensions, or a lens needing to be swelled (hydrated) to its final ready-to-wear dimensions) by the polymerization of a polymerizable composition in a mold assembly composed of said mold halves positioned to define a cavity between the convex surface of one mold half and the concave surface of the other mold half. Each mold half comprises an integral article of thermoplastic polymer transparent to ultraviolet light, said article having a central curved section defining a concave surface, a convex surface and a circular circumferential edge, at least the central portion of at least one of said concave surface and said convex surface having the reduced dimensions (e.g., for an unswelled lens, 12.7 mm in diameter versus 14.0–14.4 mm for a swelled lens) of the front or back curve, respectively, of a contact lens to be produced in said mold assembly and being sufficiently smooth that the surface of a contact lens formed by polymerization of said polymerizable composition in contact with said surface is optically acceptable, said article also having an annular flange integral with and surrounding said circular circumferential edge and extending therefrom in a plane normal to the axis of said concave surface, said article also having a generally triangular tab situated in a plane normal to said axis and extending from said flange, said article having a thinness effective to transmit heat therethrough and rigidity effective to withstand prying forces applied to separate said mold half from said mold assembly.

Another aspect of the present invention comprises a mold assembly useful in the production of a contact lens by the polymerization of a polymerizable composition in said mold assembly, said mold assembly comprising a front mold half and a back mold half in contact therewith thereby defining and enclosing a cavity therebetween, and a polymerizable composition in said cavity in contact with both said mold halves, wherein said front mold half comprises a first article of thermoplastic polymer transparent to ultraviolet light, said article having a central curved section with a concave surface, a convex surface and a circular circumferential edge, wherein the portion of said concave surface in contact with said polymerizable composition has the curvature of the front curve of a contact lens to be produced in said mold assembly, and is sufficiently smooth that the surface of a contact lens formed by polymerization of said polymerizable composition in contact with said surface is optically acceptable, said first article also having an annular flange integral with and surrounding said circular circumferential edge and extending therefrom in a plane normal to the axis of said concave surface, and a generally triangular tab situated in a plane normal to said axis and extending from said flange; said back mold half comprises a second article of thermoplastic polymer transparent to ultraviolet light, said article having a central curved section with a concave surface, a convex surface and a circular circumferential edge, wherein the portion of said convex surface in contact with said polymerizable composition has the curvature of the back curve of a contact lens to be produced in said mold assembly and is sufficiently smooth that the surface of a contact lens formed by polymerization of said polymerizable composition in contact with said surface is optically acceptable, said second article also having an annular flange integral with and surrounding said circular circumferential edge and extending therefrom in a plane normal to the axis of said convex surface, and a generally triangular tab situated in a plane normal to said axis and extending from said flange, wherein the convex surface of said back mold half contacts the circumferential edge of said front mold half, said front and back mold halves having a thinness to transmit heat therethrough and rigidity to withstand prying forces applied to separate said mold halves from said mold assembly after polymerization of said polymerizable composition in said cavity.

Another aspect of the present invention comprises a method for molding a mold half useful in subsequently molding a contact lens, the method comprising the steps of injecting molten thermoplastic under pressure into a mold in a given direction at an injection point, immobilizing the first injected portion of said molten thermoplastic upon injection thereof, using said pressure to cause said molten thermoplastic to flow through and fill a planarizing zone in said mold which has a given thickness and a width which diverges from said injection point and which lies in a plane generally oblique to said given direction, wherein the configuration and length of said planarizing zone and the temperature and mass flow rate of said molten thermoplastic are selected so that said molten thermoplastic emerges from said planarizing zone as a thin, smoothly flowing layer having a given width, using said pressure to cause said layer emerging from said planarizing zone to flow into a flange region of said mold which defines a circular flange having said given thickness and having a diameter greater than said given width wherein said flange lies in a plane essentially parallel to the plane of said planarizing zone, and into a concavo-convex region of said mold having said given thickness and circumscribed by and intersecting said flange in a circle, while maintaining the temperature and the mass flow rate of said molten thermoplastic and the rate of heat withdrawal therefrom effective to fill said regions and form in said concavo-convex region a uniform layer of said thermoplastic at least one surface of which is of optical quality, withdrawing sufficient heat from said molten thermoplastic that said thermoplastic in said planarizing zone, said flange region and said concavo-convex region forms a unitary solid article, and withdrawing said article from said mold.

The inner concave surface of the front mold half defines the outer surface of the contact lens, while the outer convex surface of the base mold half defines the inner surface of the contact lens which rests upon the eye. Accordingly, the shape of the inner concave surface of the female mold half and the shape of the outer convex surface of the male mold half must have acceptable optical quality surfaces. However, the outer convex surface of the front mold half and the inner concave surface of the base mold half need not have optical quality surfaces, and in fact the side of each mold half having one 6f those surfaces is used by robotic handling equipment to handle the mold halves.

A complementary pair of front and base mold halves is used in the production of hydrogel contact lenses by direct molding of a monomer mixture wherein the mixture is dissolved in a non-aqueous, water-displaceable solvent. The mixture is initially placed in a two part mold consisting of the front and base mold halves which define the shape of the final desired hydrogel (i.e., water-swollen) lens. After a dosing step in which the front concave mold halves are substantially filled with the polymerization mixture, the concave front mold halves are covered with the base mold halves in a manner in which no air bubbles are trapped beneath the base mold halves, which are brought to rest on the concave front mold halves properly aligned and without distortion. This is preferably performed with base mold halves which are put on as individual units on the pool of polymerizable mixture held in the front concave mold halves. Accordingly, prior to the mold covering step, the plurality of base mold halves are preferably held by a mechanical device which thereafter is used to guide them down and place them all simultaneously on each of the concave front mold halves containing the polymerizable mixture. The monomer/solvent mixture is then subjected to conditions whereby the monomer(s) polymerize, such as irradiation with actinic, visible or ultraviolet radiation, to thereby produce a polymer/solvent mixture in the shape of the final desired hydrogel lens.

After the polymerization process is completed, the two halves of the mold are separated (called demolding), typically leaving the contact lens in the front mold half, from which it is subsequently displaced. The front and base mold halves are used for only a single molding, after which they are disposed of. After the polymerization is complete, the solvent is displaced with water to produce a hydrated lens the final size and shape of which are quite similar to the size and shape of the original molded polymer/solvent article.

Each mold half defines an optical quality surface (i.e., the concave surface in the front mold half and the convex surface in the base mold half). Each mold half also defines a circumferential flange around the convex and concave surfaces. In general, the mold halves are processed and handled by robotic handling systems which handle (as by vacuum grasping) the back side of the flange which is on the opposite side from the optical quality surface of the mold half.

The manner in which the mold halves are made and used is described in greater detail hereinbelow. In general, the manufacture of the mold halves employs a heated mold (to ensure the flow rate does not decrease nor shear stresses increase) which introduces a molten mold material through a hot runner system to at least one (preferably more) mold cavity. The mold material is a thermoplastic polymer such as polystyrene, polyvinyl chloride, polyethylene, polypropylene, copolymers of styrene with acrylonitrile and/or butadiene, acrylates such as poly methyl methacrylate, polyacrylonitrile, polycarbonate, polyamides, polyesters, poly(4-methylpentene-1), and the like. Polystyrene is preferred. Each mold cavity defines an optical quality curved surface and also a second noncritical curved surface for the mold half.

Pursuant to the present invention, the optical quality surface of the mold cavity is preferably positioned further away from the heated hot runner side of the mold system than the second surface of the mold cavity, and a cooling system is provided for cooling the mold cavity. The positioning of the optical quality curved surface further away from the heated hot runner side of the mold allows faster cooling of the optical quality surface of the mold cavity. This allows quicker setting and locking of temperature residual stresses on the optical quality side of the mold half and a faster molding cycle time. This results in the slightly cooler optical quality side of the mold half having slightly less dimensional variation than the second (non-optical quality) surface of the mold half.

When the mold half is a front or female mold half, the concave surface of the female mold half defines the optical quality surface, and the concave surface of the female mold half is positioned further away from the heated hot runner system than the second surface. When the mold half is a base or male mold half, the convex surface of the male mold half defines the optical quality surface, and the convex surface of the male mold half is positioned further away from the heated hot runner system than the second surface.

In a preferred embodiment, the material being molded into the mold half is polystyrene, but could be any suitable thermoplastic such as those mentioned hereinabove. Moreover, the mold cavity comprises a first insert on the optical quality side of the mold cavity and a second insert on the second side of the mold cavity. Each insert can be manufactured as one integral component or can be a two-piece design as described hereinbelow. When the mold cavity is for the production of a front mold half, the first insert on the optical quality side of the mold can include a bushing, with a power insert positioned within the bushing, or made of a single-piece geometry design. The power insert has a convex end surface which defines the optical quality surface, which also defines the optical power of a contact lens which is subsequently produced by the front mold half (hence the name "power insert"). Moreover different optical power (diopter) lenses can be produced by merely changing the power insert to substitute a different power insert having a different curvature convex end surface. The second insert on the second side of the mold cavity does not define as high an optical quality surface, and so can easily be manufactured as one integral component.

Moreover, each of the first and second inserts has a circumferential cooling passageway defined therearound, either defined in the insert or defined in the steel mold block retaining the insert, through which coolant is circulated in a turbulent mode by the cooling system. Each of the first and second inserts also includes a bubbler positioned internally therein, through which coolant is circulated by the cooling system in a turbulent mode against inner surfaces of the insert. In a preferred embodiment, the molding arrangement includes a plurality (such as four or eight) of mold cavities positioned at one end of, and spaced around, the hot runner system.

In a further aspect of the production of the mold halves of the present invention, a molding arrangement and method is provided for molding a mold half, which is used with a second complementary mold half, for the subsequent molding of a soft contact lens. The mold half defines a convex curved surface and a concave curved surface spaced therefrom, with one of the convex and concave surfaces defining an optical quality curved surface for the soft contact lens. In the arrangement and method, a heated molding machine introduces a molten mold material through a hot runner system to at least one mold cavity. Each mold cavity defines an optical quality curved surface and also a second curved surface for the mold half. Pursuant to the teachings of the present invention, the mold cavity comprises a first insert on the optical quality side of the mold cavity and a second insert on the second side of the mold cavity. Each of the first and second inserts has a circumferential cooling passageway defined therearound, or in proximity of the insert, through which coolant is circulated by a cooling system to provide for faster cooling of the mold cavity. This allows quicker setting and locking of minimal temperature residual stresses in the mold half and a faster molding and cycling time. Also, the direct polymer flow path reduces the cooling time (locks in the minimal residual stresses) to reduce cycle time.

BRIEF DESCRIPTION OF THE DRAWINGS

The foregoing objects and advantages of the present invention for mold halves and a molding assembly may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 1 and 2 are respectively top elevational and side views of one embodiment of a front (female) mold half pursuant to the present invention;

FIG. 2A is a close up cross-sectional side view of a front (female) mold half pursuant to the present invention;

FIGS. 3 and 4 are respectively top elevational and side views of one embodiment of a base (male) mold half pursuant to the present invention;

DETAILED DESCRIPTION OF THE INVENTION

Figure 5:
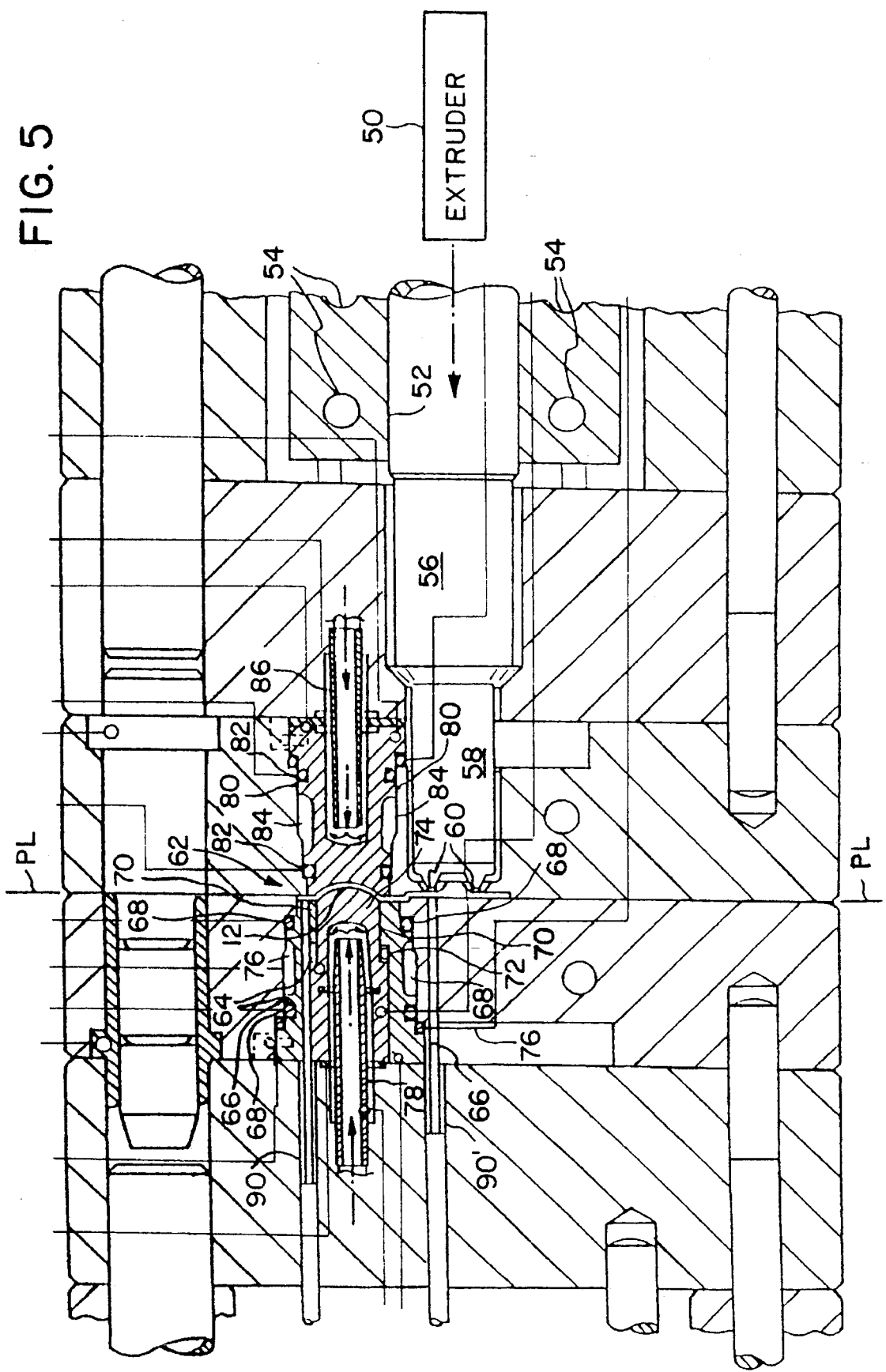
FIG. 5 is a sectional view through a hot runner mold in which one of eight similar mold cavities is shown in section to illustrate the construction of each mold cavity.
Figure 6:
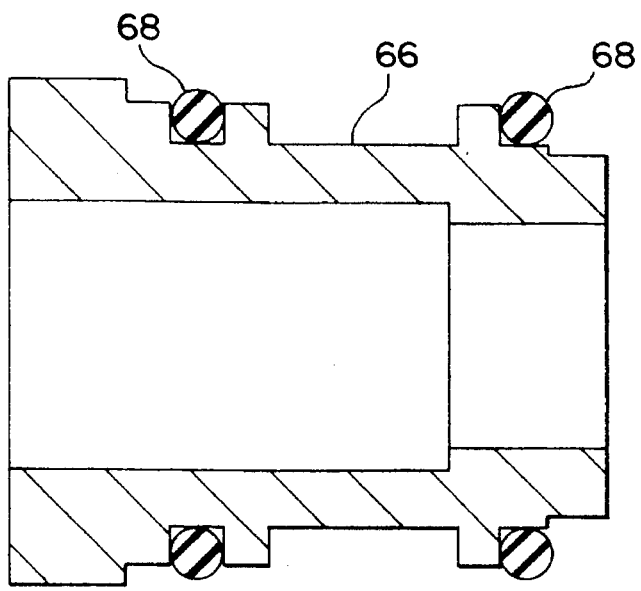
FIG. 6 is a sectional view of a bushing employed in an insert on the optical quality side of the mold cavity of FIG. 5.

Referring to the drawings in detail, FIGS. 1 and 2 illustrate respectively top elevational and side views of one embodiment of a front mold half 10 useful in the production of a contact lens by the polymerization of a polymerizable composition in a mold assembly composed of two complementary front and base mold halves. As indicated, the mold halves are useful in the production of contact lenses in that lenses can be made which are immediately ready to wear, and in that unswelled lenses can be made which need to be swelled (hydrated) to be ready to wear.

The front mold half 10 is preferably formed of polystyrene but could be any suitable thermoplastic polymer such as mentioned hereinabove which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The front mold half 10 defines a central curved section with an optical quality concave surface 12, which has a circular circumferential well defined edge 14 extending therearound. The well defined edge 14, shown in detail A of FIG. 2, is desirable to form a well defined and uniform plastic radius parting line (edge) for the subsequently molded soft contact lens. The well defined edge 14 actually has a very small curvature which can be in the range of 3 to 45 micrometers or less, preferably 5 to 30 micrometers, and the surfaces defining the edge can form an angle in the range of 75° to 90°. A generally parallel convex surface 16 is spaced from the concave surface 12, and an annular essentially uniplanar flange 18 is formed extending radially outwardly from the surfaces 12 and 16 in a plane normal (perpendicular) to the axis (of rotation) of the concave surface 12. The concave surface 12 has the dimensions of the front curve (power curve) of an unswelled contact lens to be produced by the front mold half, and is sufficiently smooth such that the surface of a contact lens formed by polymerization of a polymerizable composition in contact with the surface is of optically acceptable quality. The front mold half is designed with a thinness to transmit heat therethrough rapidly (typically in the range of 0.4 to 1.2 mm, preferably 0.5 to 1.0 mm, and more preferably 0.6 to 0.8 mm, advantageously 0.8 mm) and rigidity to withstand prying forces applied to separate the mold half from the mold assembly during demolding.

The front mold half or curve thickness was reduced from 1.5 mm in prior designs to 0.8 mm. This has a direct impact on cycle time reduction. Using a one dimensional heat flow, the cooling differential equation is:

$$\frac{\partial T}{\partial t} = a \frac{\partial^2 T}{\partial^2 t} \qquad a = \frac{k}{eCp} = \text{thermal diffusivity}$$

$$\text{cooling time} = \frac{-t^2}{\pi^2 a} \ln\left[\frac{4}{\pi} \frac{T\text{melt} - T\text{mold}}{T\text{demold temp} - T\text{mold}}\right]$$

The thermal diffusivity is proportional to specific heat, thermal conductivity and density. The cooling rate is determined by the thermal diffusivity of the material. The higher the thermal diffusivity, the faster the cooling rate.

The front mold half 10 further defines a generally triangular tab 20 integral with the flange 18 and which projects from one side of the flange. Tab 20 is essentially uniplanar and lies in a plane normal to the axis of the concave surface 12. The tab 20 extends to the injection hot tip (by the notation GATE) which supplies molten thermoplastic to the mold. The gate diameter is typically in the range of 0.4 to 1.4 mm, preferably 0.6 to 1.2 mm, and more preferably 0.8 to 1.0 mm, and is selected to result in minimal shear stress in the molten thermoplastic which is injected. Control of the gate size also helps to control the flow rate of the molten thermoplastic, which (in conjunction with temperature and rate of heat removal) helps control the final dimensional characteristics of the molded part and optimizes the processing of the molded part. The optimum size of the gate is calculated by considering the material flow index of the thermoplastic polymer, the wall thickness, part volume, and also considering the hot runner tip temperature and mold temperature.

The injection point feeds into a planarizing zone which fulfills several important functions. The planarizing zone is generally thin and flat, preferably having the same thickness as the rest of the mold cavity. The planarizing zone preferably is generally triangular, having an apex near which the injection gate point feeds molten thermoplastic into the planarizing zone. The planarizing zone diverges gradually in width from the apex region toward the rest of the mold cavity. Where the planarizing zone intersects the flange portion of the mold, the width diverges more, preferably uniformly from both sides of the zone. Thus, the planarizing zone is preferably symmetrical about the plane formed by the injection point and the axis of the concave surface of the molds.

One function of the planarizing zone is planarizing the flow of the injected molten thermoplastic into a smoothly steadily advancing flow of material filling the zone and feeding directly into the flange and concavo-convex regions of the mold. Controlling the flow characteristics imparted by the dimensions of the planarizing zone, in conjunction with the feed pressure, flow rate, and temperature of the molten thermoplastic and the rate of heat withdrawal therefrom, enables obtaining the desired characteristics of the completed mold half.

The planarizing zone also serves to form the tab 20 which is integral with the rest of the completed mold half and is an essential part of that article.

The preferred embodiment of the tab 20 is depicted in the Figures. The tab 20 defines therein an angled (e.g., 45°) web section 22, which is included in the design to break up the flow of molten thermoplastic in the molding process prior to the flow entering the optical quality portion of the mold. A step is created in the tab to break the polymer flow and smooth out the advancing melt flow, thus reducing and preferably eliminating jetting of the flowing molten thermoplastic which could lead to sink marks, dimensional inconsistency, and unacceptable irregularities in the surface of the molded mold half. The step forces a reversal of the melt momentum back to the start. This in turn causes the polymer to form an advancing front which fills the cavity more smoothly. This also moves the air in the mold cavity towards the vent lines and results in an optical part free Of weakness lines, thus producing a dimensionally superior part.

The strategic location of the vent lines in the mold as described hereinafter assists removing air and preventing possible melt flow stagnation. If this concept is not properly-engineered, the region of the flange opposite the hot runner side can have weld lines at the converging melt flows. The hot runner gate is positioned, and the tab is designed, to allow for even and uniform polymer flow so that the advancing polymer flow does not produce weld lines, which are a source of surface imperfection, mechanical stress, and a point of weakness.

Moreover, the front mold half 10 also defines a small circular projection 24 which is positioned across from the injection hot tip which supplies molten polystyrene to the mold. The projection 24 functions as a trap to immobilize a small slug of cold thermoplastic which may form at the injection hot tip between molding cycles. The plastic well 24 serves a very useful purpose by capturing the initial melt flow from the hot runner gate tip. Thus, the well 24 is positioned adjacent to the point at which the molten thermoplastic is injected into the mold. Preferably, the well 24 is directly across from that point, the better to catch the first injected thermoplastic. It is imperative that during initial injection this mass of cold polymer be trapped in the cold well and not enter the melt stream. This could cause part dimensional variations due to melt temperature and possible shrinkage variation, jetting, and freezing of the melt flow. Variations of the tab length in conjunction with the size of the cold well can vary, for example, with a longer tab length and smaller cold slug well.

The location of the hot runner gate on the tab with respect to the optical surface ensures minimal heat distortion and part dimensional stability. The location of the gate and tab geometry is designed to prevent polymer jetting (which causes marks and dimensional variations). When the melt flow hits the cold slug plane and then the step 22, impinging occurs which smooths out the melt flow. The abrupt transition at the step prevents transportation of a cold surface layer into the rest of the mold. The radius at the transition step and divergence angle of the tab, in conjunction with the flow rate and the injection pressure, results in a laminar flow of the melt flow into the optical cavity and prevents the jetting phenomena. The well opposite the gate captures the first part of the polymer stream, which allows a more homogeneous melt front which leads to improved optical quality.

The design of the flange 18 helps demolding and part handling, and also protects the optical surfaces and the well defined edge 14 as described earlier. The geometry of the tab 20 serves an additional function in straightening and orienting the assembled front curve/base curve prior to demolding. When a front mold half or curve is assembled with a base mold half or curve, a gap is formed between the two projecting tabs which is important for demolding. The gap between the tabs is in the range of 0.5 to 3.0 mm, preferably 1.0 to 2.5 mm, and more preferably 2.0 to 2.25 mm, (advantageously 2.12 mm) and is needed to initiate the demolding operation.

The flow length distance of the polymer has been significantly reduced relative to prior designs, which greatly enhances the ability to optimize the optical attributes. There is lesser probability of freezing the flow passageway as mold temperatures are reduced further to improve cycle time. It is thus one unexpectedly advantageous aspect of this invention that operations are carried out at higher thermoplastic temperatures while still realizing successful production within shortened cycle times.

FIGS. 3 and 4 illustrate respectively top elevational and side views of one embodiment of a base, or back, mold half 30. The base mold half is designed with all of the same design considerations mentioned hereinabove with respect to the front mold half 10.

The base mold half 30 is also preferably formed of polystyrene but could be any suitable thermoplastic such as those mentioned hereinabove which is transparent to ultraviolet light. The base mold half 30 defines a central curved section with an optical quality convex surface 32, a generally parallel concave surface 34 spaced from the convex surface 32, and an annular essentially uniplanar flange 36 formed extending radially outwardly from the surfaces 32 and 34 in a plane normal to the axis (of rotation) of concave surface 34. The convex surface 32 has the reduced dimensions of the rear curve (which rests upon the cornea of the eye) of an unswelled contact lens to be produced by the base mold half, and is sufficiently smooth such that the surface of a contact lens formed by polymerization of a polymerizable composition in contact with the surface is of optically acceptable quality. The base mold half designed with a thinness (typically in the range of 0.4 to 1.2 mm, preferably 0.5 to 0.8 mm, and more preferably 0.6 to 0.8 mm, advantageously 0.6 mm) to transmit heat therethrough rapidly and rigidity to withstand prying forces applied to separate the mold half from the mold assembly during demolding.

The base curve is designed with a base curve typically in the range of 1.5 to 6.5 mm, preferably 2.5 to 6.0 mm, and most preferably 5.1 to 5.8 mm (see FIG. 4 for the predetermined sag, dimension "Y"). The base curve sag and thickness of 0.6 mm serves two purposes:

1. The base curve sag results in a gap typically in the range of 0.5 to 3.0 mm, preferably 1.0 to 2.5 mm, and most preferably 2.0 to 2.25 mm, (advantageously 2.12 mm) between the assembled base curve and front curve, which allows access for mechanically removing the base curve from the front curve matrix after polymerization which forms a contact lens.

2. With a part thickness on the order of 0.6 mm, the base curve reduces the occurrence of weld lines on the distal side of the flange (where two melt flows converge) which could detrimentally cause a fracture line on the base curve.

The base mold half 30 also defines a generally triangular tab 39 integral with the flange which projects from one side of the flange. The tab 39 extends to the injection hot tip which supplies molten thermoplastic to the mold, and also defines therein an angled (e.g., 45°) web section 38 for the same reason as in the front mold half 10. The base mold half 30 also defines a small circular projection 40 for the same reasons as projection 24 in the front mold half 10.

The tab design length "X," FIG. 3, is important for the following reasons:
- minimizes heat distortion to the optical side of the part;
- the location and the distance are important;
- consistency of roundness for optical power radius;
- cycle time reduction;
- length X can vary typically in the range of 10 to 30 mm, preferably 12 to 26 mm, and more preferably 16 to 24 mm.

To achieve a minimized molding time, the thickness of each mold half should be reduced as much as possible, while considering other design constraints such as the desired rigidity of each mold half. In general, the base mold half 30 should be more flexible than the front mold half 10 and so is slightly thinner. The thickness of the front mold half 10 is thinner than a comparable prior art mold half which generally had a thickness on the order of 1.4 mm.

In one designed embodiment, the base curve and front curve thicknesses are 0.6 mm and 0.8 mm (within the ranges set forth hereinabove) respectively, to ensure adequate polymer flow without freezing the advancing melt flow, maintain the proper strength and rigidity during demolding, minimize weld line formations, and optimize cycle time reduction.

The inner concave surface of the front mold half defines the outer surface of the contact lens, while the outer convex surface of the base mold half defines the inner surface of the contact lens which rests upon the eye. Accordingly, the shape of the inner concave surface of the female mold half and the shape of the outer convex surface of the male mold half must have acceptable optical quality surfaces. The outer convex surface of the front mold half and the inner concave surface of the base mold half need not have optical quality surfaces, and in fact the side of each mold half having one of those surfaces is used by robotic handling equipment to handle the mold halves. The present invention takes advantage of this latter feature to provide molding and very rapid cooling of the critical optical quality surfaces of the contact lens molds, i.e., the inner concave surface of the front mold half and the outer convex surface of the base mold half.

Pursuant to the present invention, the master molds to mold the polystyrene mold halves are designed to achieve excellent heat transfer characteristics to quickly reduce the temperature of the polystyrene from approximately 200° to 300° C. at the injection tip (by the arrow designated GATE) at which the molten thermoplastic enters the mold to approximately 80° to 90° C., when the mold halves can be opened in approximately 3 seconds, as compared with a typical 24 second mold cycle for the prior art.

Pursuant to the present invention, and referring to FIG. 5, molten thermoplastic material is initially extruded by a screw extruder 50, at the discharge end of which is the molten thermoplastic material. When polystyrene is used, it has a temperature of approximately 200° to 300° C. The molten thermoplastic material is then introduced into a heated manifold 52 having heaters 54 therein to raise the temperature of the molten thermoplastic material further, in the case of polystyrene to approximately 270° to 280° C. The molten thermoplastic material then flows into a hot runner system 56 which feeds two multitip extruders 58 (only one of which is shown in FIG. 5), each of which has four hot tip extrusion apertures 60, two of which are illustrated in FIG. 5; at this point, molten polystyrene is approximately 200° to 300° C. One or more temperature sensors, such as thermocouples, may be strategically positioned in the molding arrangement to monitor the temperature of the molten thermoplastic, to control heaters or other parameters for control of the molding operation. Each hot tip extrusion aperture feeds a single mold cavity 62, one of which is illustrated in FIG. 5. One preferred molding arrangement includes eight mold cavities of the type illustrated in FIG. 5 which are positioned at the end of, and spaced around, the multitip extruders 58.

One of the key features of the manufacture of the mold halves of the present invention is that the optical quality surface of the mold half is positioned away from the heat source of the extrusion equipment, while the second non-optical quality surface of the mold half is positioned towards the heat source of the extrusion equipment. The arrangement illustrated in FIG. 5 is for molding the front mold half 10 of the mold halves. The concave surface 12 of the front mold half defines the optical quality surface, and accordingly the concave surface 12 of the front mold half is positioned on the left side in the molding arrangement of FIG. 5.

The molding cavity 62 illustrated in FIG. 5 includes a two piece molding insert 64 on the left side, having an outer bushing 66 which is sealed relative to the molding machine by O-rings 68. A power insert 70 is positioned in the outer bushing 66 and is sealed relative thereto by an O-ring 72. The power insert 70 is so named because its right end convex surface 74 defines the optical power of the optical quality surface of the front mold half and also of the hydrogel soft contact lens which is subsequently molded in the mold half. The two piece insert design on the left side of FIG. 5 allows the optical quality surface 74 of the power insert 70 to be machined on the relatively simpler construction of just the power insert, which simplifies the engineering and construction of the two piece insert 64. Moreover, different optical power (diopter) lenses can be produced by merely changing the power insert to substitute a different power insert having a different curvature convex end surface.

The outer surface of the bushing 66 defines an outer circumferential cooling passageway 76 therearound, through which a coolant is continuously circulated. The circumferential cooling passageway could also be defined in the mold block which retains the bushing 61, rather than in the bushing 61, to reduce manufacturing costs.

A bubbler 78 is positioned within the power insert, through which coolant is continuously circulated and ejected against the inner internal surfaces of the power insert, and then flows outwardly in a reverse direction through the annular passageway around the bubbler insert.

The right side of the mold cavity of FIG. 5 defines the nonoptical quality surface of the front mold half, and accordingly, in view of its simpler and less critical construction, is designed as a single piece insert bushing 80 which is sealed relative to the molding arrangement by O-rings 82. The bushing 80 includes an outer circumferential cooling passageway 84 through which a coolant is continuously circulated, and also mounts therein a bubbler insert 86, through which coolant is continuously circulated and ejected against the internal end surfaces of the insert 80, and then flows outwardly in a reverse direction through the annular passageway around the bubbler insert.

The coolant can be a solution of water and corrosion inhibitors, such as a fifty/fifty mixture of water and ethylene glycol. The coolant is continuously circulated in a turbulent flow mode by a cooling system having high power pumps to provide maximum cooling. Turbulent flow mode cooling is preferred to laminar flow cooling as it is approximately three times more effective than laminar flow cooling. Two separate coolant flow circuits are provided. The first coolant circuit has a high power pump with an 80 psi pressure head which circulates coolant at approximately 45° to 85° C. at a flow rate from the pump of approximately 30±5 gallons per minute to cause the coolant to circulate continuously in a turbulent flow mode through the circumferential cooling passages of each mold cavity. The eight separate mold cavities as described hereinabove are typically connected in series in the first coolant circuit, with coolant flowing in series from one mold cavity to an adjacent mold cavity, etc. The second coolant circuit also has a high power pump with an 80 psi pressure head which circulates coolant at approximately 45° to 85° C. at a flow rate from the pump of approximately 30±5 gallons per minute to cause the coolant to circulate continuously in a turbulent flow mode through the bubbler inserts in each mold cavity. A differential temperature range can be set to improve part quality.

The continuous flow of coolant through the outer circumferential cooling passages 76, 84 and the inner bubblers 78, 86 results in rapid cooling of the molded mold halves to approximately 80° to 90° C., at which temperature residual stresses are substantially locked into the molded component, particularly at the optical quality surface side, and the mold halves can be opened along parting line (PL) to remove the molded mold halves without damaging the optical quality surface of the mold halves. After opening of the mold, a plurality of ejector pins 90, four positioned circumferentially around the mold cavity and a fifth 90' positioned at the mold tab, are displaced to the right as illustrated in FIG. 5, to eject the mold half from each cavity.

The systematic arrangement of the five ejector pins serves a useful purpose. The ejector pins are positioned to ensure minimal stress buildup in the part during part ejection; this is very important to ensure part dimensional consistency. One ejector pin is located at the distal end of the part (opposite side of the hot runner gate) to ensure adequate mold gas venting during the final filling phase, and the reduction of weld lines. The arrangement ensures smooth and reliable ejection after the part has reasonably cooled down and to minimize stress formation. This again ensures dimensional consistency. This concept lends well to cycle efficiency and deters parts from sticking to the wrong side of the mold.

FIG. 5 illustrates molding of the front mold halves 10. The base mold halves 30 are molded in a similar arrangement, with similar mold inserts, except that the power insert now has a concave optical quality end surface as the base mold halves 30 have an optical quality surface on their convex surface rather than on their concave surface. Accordingly, the curve of the mold cavity extends in an opposite direction to that illustrated in FIG. 5 (i.e., the curve bows to the left, rather than to the right).

In practice, the thermoplastic material of choice is provided in molten form. It is then injected through an extrusion aperture 60 on an axis oblique to the plane of the planarizing zone which forms tab 20. Preferably, that axis is perpendicular to that plane. The first portion of thermoplastic entering the mold is caught and immobilized by well 24.

The molten thermoplastic is injected under pressure which is sufficient to cause the thermoplastic to flow into and fill the mold as described herein. No other source of force acting on the thermoplastic is used. The amount of pressure is interrelated with the thermoplastic temperature, rate of heat withdrawal, and the configuration of the planarizing zone and the other regions of the mold, to achieve the desired rigidity and surface smoothness of the final article. Generally, specific injection pressures in the range of about 700 bar to about 1200 bar are effective.

The flow of molten thermoplastic is planarized in the planarizing zone into a smoothly advancing laminar flow of material filling that zone and emerging therefrom. As described elsewhere herein, the planarizing zone diverges in width as the flow proceeds away from the injection point. Thus, the injection pressure and the thermoplastic flow rate must be adjusted so that the zone is filled and the front of material advancing moves smoothly and quickly. At the same time, the configuration of this zone (by which is meant the length through which the molten thermoplastic flows, and the shape including discontinuities such as angled section 22) form the desired smooth, laminar flow in conjunction with the injection pressure and flow rate. Preferably, the distance from the injection point to the optical center of the concavo-convex region is 10 to 30 millimeters.

As the molten thermoplastic flows through and fills the planarizing zone, its temperature is decreasing because heat is flowing from it into the walls of the mold which, though they may be at a temperature above ambient (e.g., 55° to 85° C.) are nonetheless at a temperature below that of the molten thermoplastic. The temperature of the molten thermoplastic and the rate of heat withdrawal also must be provided so that the thermoplastic remains flowable, without exhibiting internal or surface irregularities, while also permitting solidification to occur quickly upon the thermoplastic filling the entire mold cavity.

The advancing layer emerging from the planarizing zone flows, under the injection pressure, into the area of the mold that defines the circular flange 18 and the concavo-convex region bounded by the flange. The pressure, mass flow rate, temperature upon injection, and heat withdrawal rate must all be interrelatedly adjusted such that in association with the particular dimensions (e.g., diameter and thickness) the article that is formed is of the desired integrity, surface smoothness, and freedom from defects. It is a particularly unexpected facet of the invention that objects having the shape of the mold halves, and the desired integrity and reproduceability of the optical properties, yet only less than 1 mm in thickness, can be formed in a total cycle time as short as that employed in this process.

The advancing layer of molten thermoplastic moves under the influence of the injection pressure into the flange area closest to the injection point, then around that flange and across the concavo-convex mold portion, and converges at a point diametrically across the concavo-convex portion from the injection point. Vent holes are disposed preferably at angles of 20° to 30° off that diameter, to permit expulsion of gas from the mold as the molten thermoplastic fills it.

It has now been found possible how to achieve proper balancing of all the molding conditions, including injection temperature and pressure, length and configuration of the planarizing zone, dimensions of the flange and concavo-convex regions, and rate of heat withdrawal from the thermoplastic, effective to enable reproducible, rapid formation of a solidified, molded mold half satisfying the criteria of surface smoothness, one-piece integrity (including the tab 20), and exacting thickness, within a cycle time of less than 10 seconds, preferably less than 4 seconds.

At the end of the molding cycle, the mold is opened and the mold half is removed preferably by use of a robotic means that handles the mold half only at the surface opposed to the surface that will contact the polymerizable mixture intended to form a contact lens. Advantageously, the elapsed time from injection of molten thermoplastic to formation of the solid, integral article ready to remove from the mold, is less than 10 seconds, preferably 8 seconds or less, and more preferably about 3 seconds or less.

The term "optical quality" used to describe certain of the concave and convex surfaces of the mold halves, is intended to mean that the surface is smooth enough that when a polymerizable monomeric mixture of materials is polymerized, while in contact with that surface, into a product having the shape and (upon hydration, if necessary) dimensions, refractive properties and water content of a ready-to-wear contact lens, the contact lens can be worn in the eye without causing irritation or damage due to surface irregularities on the lens. When a contact lens is said as a whole to be of "optical quality," it has that degree of surface smoothness and contour precision and also is sufficiently free of internal defects to provide the desired refractive correction without distortion. Known analytical techniques, such as interferometry, can be employed to confirm the smoothness and contour precision of the surfaces.

As indicated, the front mold half and base mold half are useful together for the formation of molded contact lenses. To practice this aspect of the invention, the front mold half is positioned so that its concave surface is open upward. Most preferably, the axis of rotation of the mold half is vertical. These objectives can be assured by providing a holder or carrier having a flat top surface and one or more holes or depressions each capable of holding one mold half and dimensioned so that the flange surrounding the concave portion of the mold half rests on the top surface of the holder or carrier and the curved central portion of the mold half extends into the hole or depression, support for the mold half being provided entirely from the flange.

Next, a quantity of a polymerizable composition is placed into the concave region of the mold half. The composition, which is preferably a flowable liquid, can comprise any composition which upon polymerization yields an optically clear, integral, shape-sustaining contact lens. Examples of such compositions abound in this field and are readily ascertainable by reference to standard literature sources. Examples including copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacrylic acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid or methacrylic acid and a polyhydric alcohol, such as ethylene glycol and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by visible light, ultra-violet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

An amount of the polymerizable composition, generally on the order of about 50 to 180 mg, preferably 60 mg. is placed into the concave region of the front mold half. The desired amount depends on the dimensions (i.e., diameter and thickness) of the desired lens, taking into account the generation of by-products upon polymerization and the exchange of water for those by-products and diluent, if any, following polymerization.

Then, a base mold half, with its concave region facing downwardly, is placed onto the polymerizable composition. Most preferably, the front and base mold halves are aligned so their axes of rotation are colinear and their respective flanges are parallel. The presence of the flange helps the demolding step, and parts handling to protect the optical surfaces and the well defined edge. The tabs also help to straighten and orient the mold assembly (i.e., of the front and back mold halves) prior to demolding.

The handling and positioning of the base mold half, as well as the handling and positioning of the front mold half, are preferably carried out so that the surfaces which are to contact the polymerizable composition itself contact nothing else. This objective can be achieved by holding the mold halves manually or mechanically at the outer edges of the flanges, or on the surfaces opposite to those which contact the polymerizable composition.

In addition, the mold halves should be kept free of oxygen where oxygen, if present, would diffuse into and inhibit the polymerizable composition. These objectives can be achieved by keeping the mold halves, and forming the mold assembly, under a blanket of an inert gas such as nitrogen.

Figure 7:
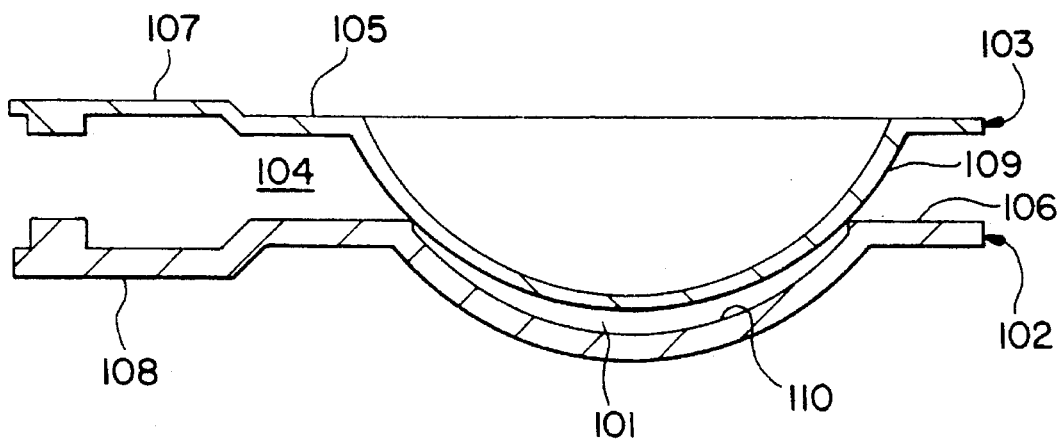
FIG. 7 is a side view of a mold assembly made of a front mold half and a base mold half.

The mold assembly formed as described herein is shown in FIG. 7. The polymerizable composition occupies the cavity 101 formed between the front and base mold halves 102 and 103, respectively. Preferably, the volume of polymerizable composition exceeds the volume of the cavity; thus, placement of the base mold half onto the polymerizable composition may displace a small quantity of the composition from the cavity into the area 104 between the flanges 105 and 106. The flange 106 must be of a uniform radius to aid in processing. As shown, the tabs 107 and 108 extending from a side of each mold half are preferably positioned one over the other, to facilitate using them to handle the mold assembly and to pry apart the halves after the polymerization.

Also, as shown, the base mold half 103 is dimensioned so that its convex region 109 is wider than the concave region 110 of the front mold half 102. This feature facilitates self centering during assembly which acts as an alignment device, and facilitates as well the provision of a space between the flanges of the two mold halves. As mentioned above, that space should be selected so as to provide effective demolding.

Polymerization of the polymerizable composition in the mold assembly is preferably carried out by exposing the composition to polymerization initiating conditions. The preferred technique is to include in the composition initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. The polymerization is permitted to proceed to completion; the required duration of the reaction can readily be ascertained experimentally for any polymerizable composition.

After the polymerizable composition has polymerized, the mold assembly is disassembled to permit further processing of the polymerized product into a contact lens (such processing including e.g., washing and hydrating, and packaging of the lens). Preferably, the flanges of the front and base mold halves are gripped and pulled away from each other, either in directly opposite directions or through an angle in a prying sort of motion. Advantageously, the assembly is first heated moderately to facilitate separation of the polymerized article from the mold half surfaces.

The reduced dimensions curvature that should be present on the concave surface of the front mold half and on the convex surface of the base mold half should match the curves desired on the front and back surfaces, respectively, of the desired contact lens upon hydration and swelling. Those curves, as well as the thickness of the lens, can be determined readily, using known techniques; the dimensions of the mold halves are derived from the optical (refractive) properties of a desired lens from any given polymer, including the power desired in the lens. As is well recognized in the practice of contact lens manufacture, that derivation takes into account by known means the fact that the finished, ready-to-wear contact lens is somewhat swollen (by hydration in physiologically compatible saline solution) relative to its dimensions when molded.

While several embodiments and variations of the present invention for a molding arrangement with a mold insert design to achieve short mold cycle time are described in detail herein, it should be apparent that the disclosure and teachings of the present invention will suggest many alternative designs to those skilled in the art.

What is claimed is:

1. A mold half useful in the production of a contact lens, the contact lens having a front convex curve and a back concave curve, by polymerization of a polymerizable composition in a mold assembly comprised of the mold half and a second mold half, the mold half comprising an integral article of thermoplastic polymer transparent to ultraviolet light, the article having a central curved section defining a concave surface, a convex surface and a circular circumferential edge, at least a central portion of at least one of said concave surface and said convex surface having the dimensions of the front convex curve or the back concave curve and being sufficiently smooth and contoured that the contact lens formed by polymerization of the polymerizable composition in contact with said concave or convex surface is optically acceptable, the concave or convex surface having an axis of symmetry and the article also having an annular flange integral with and surrounding said circular circumferential edge and extending therefrom in a plane normal to the axis of the concave surface, the article also having a generally triangular tab situated in a plane normal to the axis and extending from the flange, the article having a thinness and rigidity effective to transmit heat therethrough rapidly and to withstand prying forces applied to separate the mold half from the mold assembly.

2. A mold half in accordance with claim 1 which is essentially free of oxygen.

3. A mold half in accordance with claim 1 wherein said thermoplastic polymer is polystyrene.

4. A mold half in accordance with claim 1 which is of essentially uniform thickness.

5. A mold half in accordance with claim 1 wherein the central portion of said convex surface has the dimensions of the back curve of a swelled or unswelled contact lens that can be produced by polymerization of a polymerizable composition in contact with said convex surface, and wherein said convex surface is sufficiently smooth that the surface of said back curve of said contact lens can be worn comfortably in the eye.

6. A mold half in accordance with claim 5 which is essentially free of oxygen.

7. A mold half in accordance with claim 5 wherein said thermoplastic polymer is polystyrene.

8. A mold half in accordance with claim 5 which is of essentially uniform thickness.

9. A mold half in accordance with claim 1 wherein said concave surface has the dimensions of the front curve of a contact lens that can be produced by polymerization of a polymerizable composition in contact with said concave surface, and said concave surface is sufficiently smooth that the surface of said front curve can be worn comfortably in the eye.

10. A mold half in accordance with claim 9 further comprising an annular edge around the circumference of said concave surface.

11. A mold half in accordance with claim 9 which is essentially free of oxygen.

12. A mold half in accordance with claim 9 wherein said thermoplastic polymer is polystyrene.

13. A mold half in accordance with claim 9 which is of essentially uniform thickness.

14. A mold assembly useful in the production of a contact lens, the lens defined by a front curve and a back curve, by the polymerization of a polymerizable composition in the mold assembly, the mold assembly comprising a front mold half and a back mold half in contact therewith thereby defining and enclosing a cavity therebetween, and a polymerizable composition in the cavity in contact with both said mold halves, wherein the front mold half comprises a first article of thermoplastic polymer transparent to ultraviolet light, the article having a central curved section with a concave surface, a convex surface and a circular circumferential edge, wherein the central section of the concave surface is in contact with the polymerizable composition and imparts a curvature to the front curve of a contact lens to be produced in the mold assembly, and is sufficiently smooth that the contact lens formed by polymerization of the polymerizable composition in contact with the central section is optically acceptable, the first article also having an axis of symmetry about the concave surface and further having an annular flange integral with and surrounding the circular circumferential edge and extending therefrom in a plane normal to the axis of the concave surface, and a generally triangular tab situated in a plane normal to the axis and extending from the flange;

the back mold half comprises a second article of thermoplastic polymer transparent to ultraviolet light, the article having a central curved section with a concave surface, a convex surface and a circular circumferential edge, wherein the central section of the convex surface is in contact with the polymerizable composition and imparts a curvature to the back curve of a contact lens to be produced in the mold assembly and is sufficiently smooth that the contact lens formed by polymerization of the polymerizable composition in contact with the central section is optically acceptable, the second article also having an axis of symmetry about the convex surface and further having an annular flange integral with and surrounding the circular circumferential edge and extending therefrom in a plane normal to the axis of the convex surface, and a generally triangular tab situated in a plane normal to the axis and extending from the flange;

wherein the convex surface of the back mold half contacts the circumferential edge of the front mold half;

the front and back mold halves having a thinness and rigidity effective to transmit heat therethrough rapidly and to withstand prying forces applied to separate the mold halves from the mold assembly after polymerization of the polymerizable composition in the cavity.

15. A mold assembly in accordance with claim 14 wherein the surfaces of said mold halves in contact with said polymerizable composition, and said polymerizable composition, are essentially free of oxygen.

16. A mold assembly in accordance with claim 14 wherein the circumferential edge of said concave surface of said front mold half terminates in an annular edge.

17. A mold assembly in accordance with claim 14 wherein said front and back mold halves are made of polystyrene.

18. A mold assembly in accordance with claim 14 wherein said front mold half is of a first uniform thickness and said back mold half is of a second uniform thickness.

19. A method for molding a mold half useful in subsequently molding a contact lens, comprising injecting molten thermoplastic under pressure at a selectable temperature and mass flow rate into a mold in a given direction at an injection point, immobilizing a first injected portion of the molten thermoplastic upon injection thereof, using the pressure to cause the molten thermoplastic to flow through and fill a planarizing zone in the mold which has a given thickness and a width which diverges from the injection point in a plane generally oblique to the given direction, wherein the planarizing zone is configured and the temperature and mass flow rate of the molten thermoplastic are selected so that the molten thermoplastic emerges from the planarizing zone as a thin, smoothly flowing layer having a given width, using the pressure to cause the layer emerging from the planarizing zone to flow into a flange region of the mold which defines a circular flange having the given thickness and having a diameter greater than the given width wherein the flange lies in a plane essentially parallel to the plane of the planarizing zone, and into a concavo-convex region of the mold having the given thickness and circumscribed by and intersecting said flange in a circle, while maintaining the temperature and the mass flow rate of the molten thermoplastic and a rate of heat withdrawal therefrom effective to fill said regions and form in the concavo-convex region a uniform layer of the thermoplastic at least one surface of which is of optical quality, withdrawing sufficient heat from the molten thermoplastic that the thermoplastic in the planarizing zone, the flange region and the concavo-convex region forms a unitary solid article, and withdrawing the article from the mold.

20. A method according to claim 19 wherein said molten thermoplastic is injected into said mold in a direction essentially perpendicular to the plane of said planarizing zone.

21. A method according to claim 19 wherein said first injected portion of said molten thermoplastic is immobilized by retaining it in a well positioned in said planarizing zone to receive said first portion directly upon injection thereof into said mold.

22. A method according to claim 19 wherein said molten thermoplastic is injected into said mold in a direction essentially perpendicular to the plane of said planarizing zone and wherein the first injected portion of said molten thermoplastic flows under said pressure into, and remains in, a well positioned in said planarizing zone axially to said direction.

23. A method according to claim 22 wherein said planarizing zone is symmetrically aligned about a radius of said concavo-convex region.

24. A method according to claim 23 wherein said planarizing zone is substantially triangular-shaped having a rounded apex on a radius of said concavo-convex region, and wherein said injection point and said well are adjacent said apex on said radius.

25. A method according to claim 19 wherein said planarizing zone is configured to include at least one step in a plane oblique to the plane of said planarizing zone.

26. A method according to claim 19 wherein the temperature of said molten thermoplastic upon injection into said mold is about 200° C. to about 300° C., and the temperature of said mold is about 45° C. to about 85° C.

27. A method according to claim 26 wherein said mold half has a constant thickness which is less than 1 millimeter.

28. A method according to claim 26 wherein said mold half has a constant thickness which is less than 0.8 millimeter.

29. A method according to claim 27 wherein the elapsed time from said injecting through said withdrawing is about 10 seconds or less.

30. A method according to claim 27 wherein the elapsed time from said injecting through said withdrawing is about 3 seconds or less.

* * * * *